(12) United States Patent
Lin et al.

(10) Patent No.: US 11,328,709 B2
(45) Date of Patent: May 10, 2022

(54) SYSTEM FOR IMPROVING DYSARTHRIA SPEECH INTELLIGIBILITY AND METHOD THEREOF

(71) Applicant: National Chung Cheng University, Chia-Yi (TW)

(72) Inventors: Tay-Jyi Lin, Chiayi County (TW); Ching-Hau Sung, Taipei (TW); Che-Chia Pai, Taipei (TW); Ching-Wei Yeh, Chia-Yi (TW)

(73) Assignee: NATIONAL CHUNG CHENG UNIVERSITY, Chia-yi (TW)

( * ) Notice: Subject to any disclaimer, the term of this patent is extended or adjusted under 35 U.S.C. 154(b) by 161 days.

(21) Appl. No.: 16/545,898

(22) Filed: Aug. 20, 2019

(65) Prior Publication Data
US 2020/0312302 A1   Oct. 1, 2020

(30) Foreign Application Priority Data

Mar. 28, 2019  (TW) .................................. 108111066

(51) Int. Cl.
| | |
|---|---|
| *G10L 15/07* | (2013.01) |
| *G10L 15/16* | (2006.01) |
| *G10L 15/06* | (2013.01) |

(52) U.S. Cl.
CPC ............ *G10L 15/07* (2013.01); *G10L 15/063* (2013.01); *G10L 15/16* (2013.01)

(58) Field of Classification Search
CPC ..... G10L 15/1822; G10L 15/16; G10L 15/06; G10L 15/065; G10L 15/1815; G10L 15/063; G10L 15/07; G10L 2015/226; G10L 21/0364; G10L 21/003; G10L 21/02; G10L 17/26; G10L 13/00;
(Continued)

(56) References Cited

U.S. PATENT DOCUMENTS

| | | | |
|---|---|---|---|
| 10,186,251 B1 * | 1/2019 | Mohammadi | ....... G10L 13/0335 |
| 2009/0089063 A1 * | 4/2009 | Meng | ...................... G10L 21/00 704/270 |
| 2018/0190284 A1 * | 7/2018 | Singh | ...................... G10L 15/22 |

OTHER PUBLICATIONS

Sharifzadeh et al., "Phonated speech reconstruction using twin mapping models," 2015 IEEE International Symposium on Signal Processing and Information Technology (ISSPIT), Abu Dhabi, United Arab Emirates, 2015, pp. 1-6, doi: 10.1109/ISSPIT.2015.7394247. (Year: 2015).*

(Continued)

*Primary Examiner* — Michelle M Koeth
(74) *Attorney, Agent, or Firm* — Muncy, Geissler, Olds & Lowe, P.C.

(57) ABSTRACT

A system for improving dysarthria speech intelligibility and method thereof, are provided. In the system, user only needs to provides a set of paired corpus including a reference corpus and a patient corpus, and a speech disordering module can automatically generate a new corpus completely synchronous with the reference corpus, and the new corpus can be used as a training corpus for training a dysarthria voice conversion model. The present invention does not need to use a conventional corpus alignment technology or a manual manner to perform pre-processing on the training corpus, so that manpower cost and time cost can be reduced, and synchronization of the training corpus can be ensured, thereby improving both training and conversion qualities of the voice conversion model.

6 Claims, 5 Drawing Sheets

(58) Field of Classification Search
CPC . G10L 2021/0135; G10L 25/66; G10L 25/63; G06F 40/00; G06N 20/00; G06N 3/0454; G06N 3/08; G06N 5/02; G06N 7/005
See application file for complete search history.

(56) References Cited

OTHER PUBLICATIONS

Tanaka et al., "Enhancing a glossectomy patient's speech via GMM-based voice conversion," 2016 Asia-Pacific Signal and Information Processing Association Annual Summit and Conference (APSIPA), Jeju, Korea (South), 2016, pp. 1-4, doi: 10.1109/APSIPA. 2016.7820909. (Year: 2016).*

Kim et al., "Automatic Intelligibility Assessment of Dysarthric Speech Using Phonologically-Structured Sparse Linear Model," in IEEE/ACM Transactions on Audio, Speech, and Language Processing, vol. 23, No. 4, pp. 694-704, Apr. 2015, doi: 10.1109/TASLP. 2015.2403619. (Year: 2015).*

Wen et al., "Deep neural network based voice conversion with a large synthesized parallel corpus," 2016 Asia-Pacific Signal and Information Processing Association Annual Summit and Conference (APSIPA), Jeju, Korea (South), 2016, pp. 1-5, doi: 10.1109/ APSIPA.2016.7820716. (Year: 2016).*

Li et al., "Large-Scale Domain Adaptation via Teacher-Student Learning", 2017, arXiv:1708.05466v1 [cs.CL] (Year: 2017).*

* cited by examiner

SYSTEM FOR IMPROVING DYSARTHRIA SPEECH INTELLIGIBILITY AND METHOD THEREOF

This application claims priority for Taiwan patent application no. 108111066 filed on Mar. 28, 2019, the content of which is incorporated by reference in its entirely.

BACKGROUND OF THE INVENTION

1. Field of the Invention

The present invention relates to a dysarthria voice conversion technology, and more particularly to a system of improving dysarthria speech intelligibility, and a method thereof.

2. Description of the Related Art

According to a study by American speech language hearing association (ASHA), there are more than five million dysarthria patients in the United States. Most of the dysarthria patients include stroke patients, cerebral palsy patients, and Parkinson's disease patients. Dysarthria is a neurodegenerative disease, and the dysarthria patients are characterized by lisp because of the abnormalities in strength, speed, stability, and timbre while speaking, therefore it is hard for other people to understand the dysarthria patient's speech, which impacts the quality of the dysarthria patient's life. After more than a hundred years of research, drugs for delaying neurodegeneration and rehabilitation treatments for improving muscle control have been developed, but the treatment effects of the drugs and rehabilitation treatments vary from person to person, and usually do not improve the conditions substantially.

Some researchers have proposed to use a voice conversion technology to convert a patient's voice into a normal person's voice by a voice conversion model, so as to enhance the patient's voice intelligibility and comprehension. However, the pre-processing of a conventional voice conversion process has poor quality on the dysarthria patient's speech signal. Furthermore, a large number of paired corpus are required in order to train a voice conversion model. And the training corpus is difficult to obtain because it is difficult for patients to control physical strength to make a sound.

The Gaussian mixture model (GMM) and deep neural network (DNN) are generally used in the voice conversion system to crystallize patients' voice, so as to reduce patients' communication barriers. The manner of using a Gaussian mixture model (GMM) is to extract speech features (such as timbre, pitch, etc.) of the reference corpus and patient corpus, and find relationships between the speech features of reference corpus and patient corpus as a basis of mapping the speech features of the patient corpus to those of the reference corpus. In order to find the relationships, the sentences of the reference corpus and the patient corpus need to be aligned first. Furthermore, manner of using a deep neural network (DNN) is to perform framing process on the speech material, and then use a DNN to learn the relationships between aligned frames of the reference corpus and the patient corpus in the same time domain. Since the time unit of the frame can be as small as a millisecond, any slight offset biases of the alignment between the reference corpus and the patient corpus content may obviously impact the voice conversion quality.

According to the above-mentioned content, the training data alignment of the speech model is one of the factors affecting the voice conversion quality. In conventional technologies, "corpus alignment" is mostly performed by analyzing the relationships of the two corpuses. For example, dynamic time warping (DTW) is a method of calculating similarity of two temporal sequences with different lengths, and local scaling is performed on the time line to make the states of the two temporal sequences as consistent as possible. Pitch synchronous overlap and add (PSOLA) is a digital signal processing technology for speech synthesis. It can divide a speech signal into multiple frames, and then overlap and add the frames again to change the timbre or the duration of the speech signal.

In the conventional voice conversion system, the aligned training corpus often leads to better training and conversion quality, so some speech alignment technologies such as DTW and PSOLA, are often used to perform pre-processing on the training corpus, but, these speech alignment technologies are difficult to achieve completely alignment. Please refer to FIG. 1, which shows that the non-completely aligned corpus is used in a voice conversion system 10 for dysarthria patients. As shown in FIG. 1, since the patient's speech is usually very unclear, the speech alignment technology 40 can only provide a limited alignment quality, besides popping or data missing occurs in the corpus easily. As a result, in practical applications, it is necessary to manually align the patient corpus 20 with the content of the reference corpus 30, and the manual alignment operation causes high manpower and time cost.

SUMMARY OF THE INVENTION

An objective of the present invention is to provide a system for improving dysarthria speech intelligibility and method thereof. In the system and the method, a user only needs to provide a set of paired corpus including a reference corpus and a patient corpus, then a speech disordering module can generate a new corpus, which is completely synchronous with the reference corpus, as a training corpus of a voice conversion system for dysarthria patients. The training corpus can be used to complete training of a voice conversion model, thereby improving model training and conversion qualities.

Another object of the present invention is to provide a system for improving dysarthria speech intelligibility and method thereof. In the system, a speech disordering module can be used to generate a synchronous corpus for training without the pre-processing performed by conventional corpus alignment technology, so that the manpower and time cost of the manual alignment can be reduced and the entire process of generating the corpus can be performed automatically.

In order to achieve the objective, the present invention provides a system for improving dysarthria speech intelligibility and method thereof. The system includes a speech disordering module and a voice conversion model trainer. The speech disordering module is configured to receive a set of paired corpus comprising a reference corpus and a patient corpus under the same script, and convert the set of paired corpus into a synchronous corpus. The voice conversion model trainer is configured to receive the reference corpus and the synchronous corpus, as a set of training corpus, and use the set of training corpus to train a voice conversion model.

In order to achieve the objective, the present invention provides a method of improving dysarthria speech intelligibility. The method includes steps of: receiving a set of paired corpus comprising a reference corpus and a patient corpus under the same script; converting the set of paired corpus into a synchronous corpus; using the reference corpus and the synchronous corpus as a set of training corpus, and using the set of training corpus to train a voice conversion model.

According to an embodiment, the method of converting the paired corpus into the synchronous corpus can be implemented by a Gaussian-mixture-model-based voice conversion system or a deep-neural-network-based voice conversion system, or implemented by extracting a plurality of speech feature parameters and using a speech synthesis technology.

According to an embodiment, the manner of using the training corpus to train the voice conversion model can be implemented by a Gaussian-mixture-model-based voice conversion system or a deep-neural-network-based voice conversion system.

According to the present invention, system of improving dysarthria speech intelligibility and the method thereof, the new corpus generated by processing the reference corpus can be used as the training corpus, so as to ensure that the new corpus can be completely synchronized with the reference corpus, thereby improving training and conversion qualities of the voice conversion model. Furthermore, the system and method of the present invention does not need to use the conventional corpus alignment technology to perform the pre-processing on the corpus, so that the manpower and time cost of manual alignment can be reduced, and the entire process of generating the corpus can be performed automatically.

BRIEF DESCRIPTION OF THE DRAWINGS

The structure, operating principle and qualities of the present invention will be described in detail by way of various embodiments which are illustrated in the accompanying drawings.

DETAILED DESCRIPTION OF THE PREFERRED EMBODIMENTS

Figure 1:
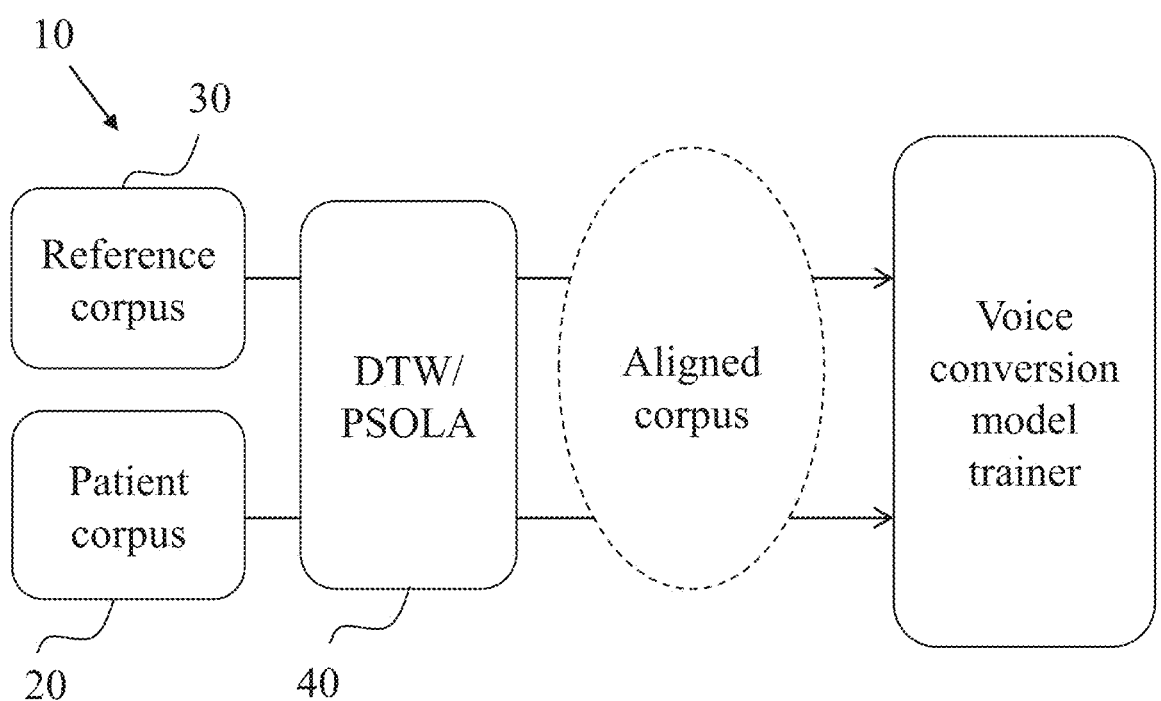
FIG. 1 is a schematic view of a conventional dysarthria voice conversion system.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

A conventional voice conversion system generally uses a speech alignment technology (such as DTW, PSLOA, etc.) to perform alignment on the training corpus before the training process of a conversion model. Compared with the conventional voice conversion system, the system and method of improving dysarthria speech intelligibility of the present invention uses a speech disordering module to replace the speech alignment technology of the conventional voice conversion system, which will automatically generate a synchronous corpus for training a voice conversion model, so that the operation of aligning the training corpus by the speech alignment technology or manual manner before training can be omitted, thereby reducing the time and manpower costs and making the training corpus completely synchronized.

Figure 2:
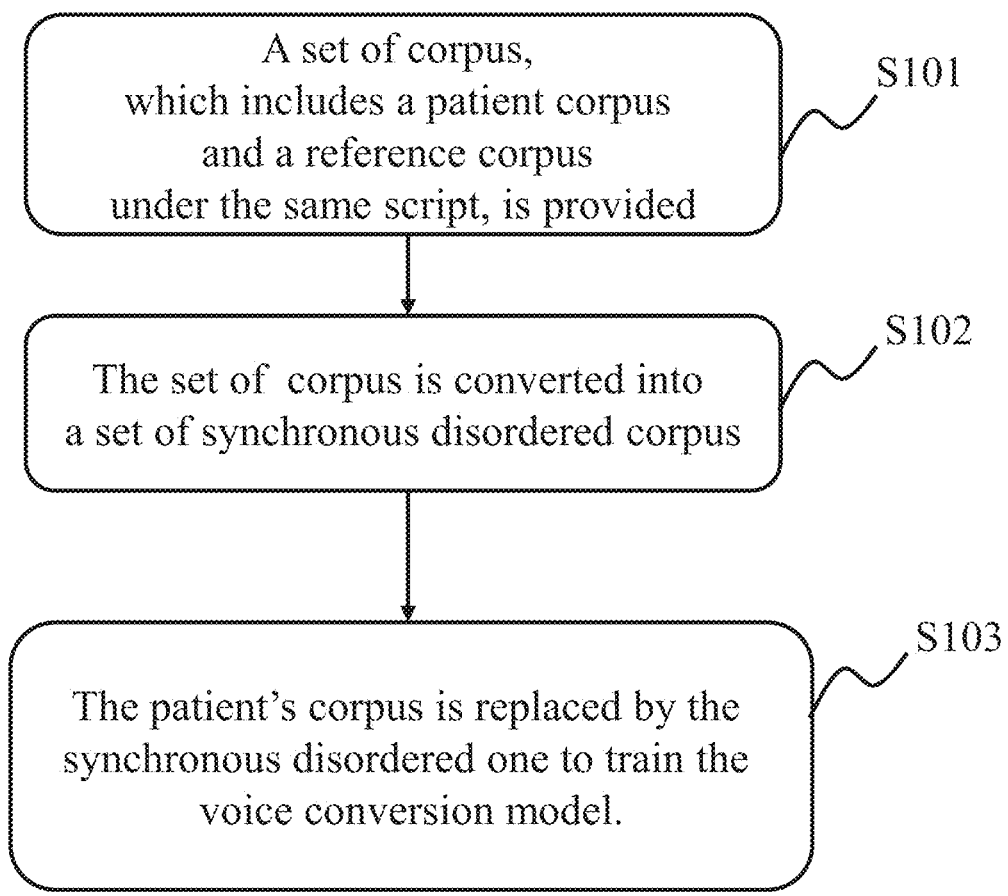
FIG. 2 is a flowchart of a method of improving dysarthria speech intelligibility, according to an embodiment of the present invention.

Please refer to FIG. 2, which is a flow of implementation of a method for improving dysarthria speech intelligibility according to an embodiment of the present invention. The methods can include steps S101 to S103.

In step S101, a set of corpus, which includes a reference corpus and a patient corpus under the same script, is provided In an embodiment, a reference speaker's speech signal is collected as the reference corpus and a patient speaker's speech signal is collected as the patient corpus. For example, the patient speaker can be a dysarthria patient.

In step S102, the collected paired corpus are converted into a set of synchronous corpus.

In an embodiment, the synchronous corpus is a new corpus generated by converting the paired corpus; in other words, the synchronous corpus is the processed reference corpus and can reserve an original timbre of the reference corpus, so as to ensure that generated new corpus and the reference corpus are fully synchronous with each other.

In an embodiment, the steps of converting the paired corpus into the synchronous corpus can be implemented by a Gaussian-mixture-model-based voice conversion system or a deep-neural-network-based voice conversion system, or implemented by extracting a plurality of speech feature parameters and using a speech synthesis technology. For example, the plurality of speech feature parameters can include jitter, shimmer, and so on.

In step S103, the original reference corpus and the newly-generated synchronous corpus are used as a set of training corpus, and the set of training corpus is used to train a voice conversion model. As a result, the trained voice conversion model can achieve the purpose of improving the dysarthria speech intelligibility.

In an embodiment, the step of using the set of training corpus to train the voice conversion model can be implemented by a Gaussian-mixture-model-based voice conversion system or a deep-neural-network-based voice conversion system.

Figure 3:
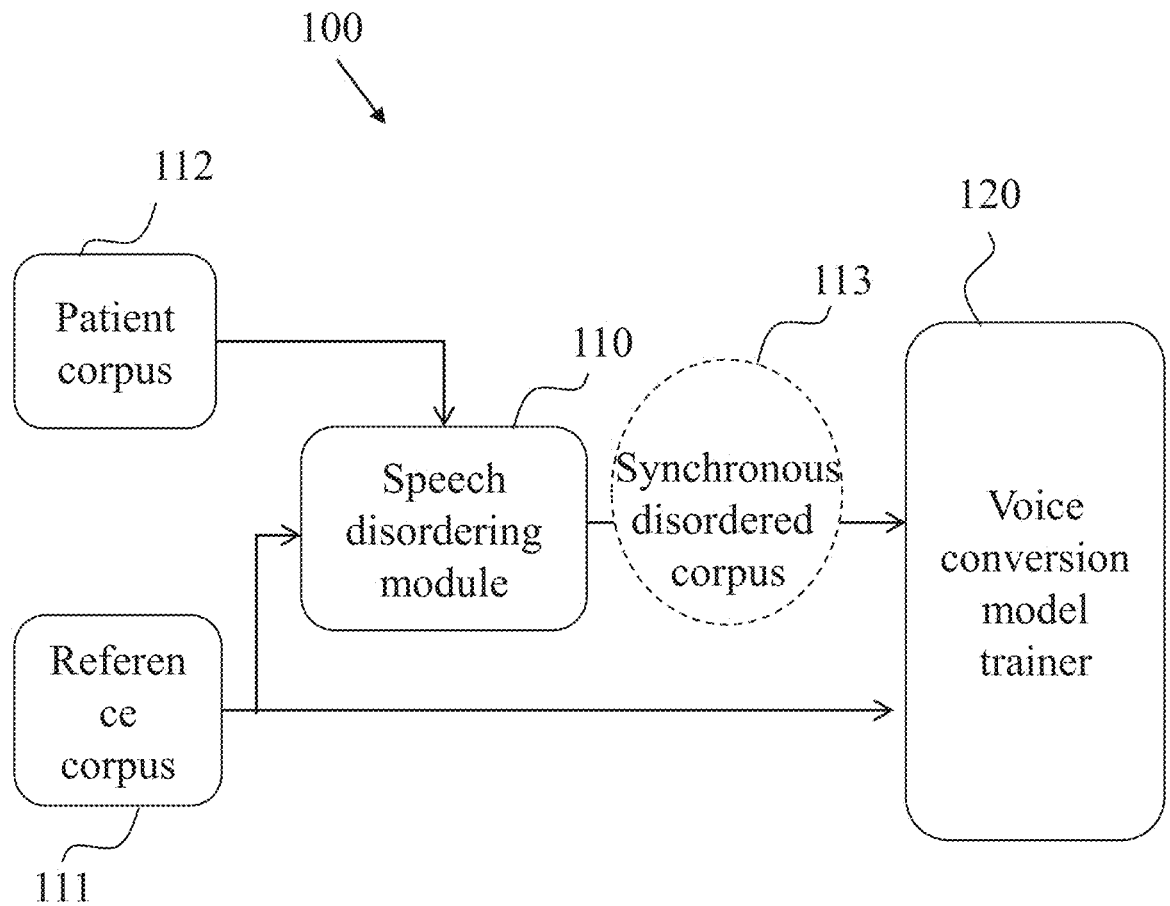
FIG. 3 is a block diagram of a system of improving dysarthria speech intelligibility according to an embodiment of the present invention.

Please refer to FIG. 3, which shows an architecture of a system of improving dysarthria speech intelligibility according to an embodiment of the present invention. For convenience in explanation, only parts related to the embodiment of the present invention are shown in FIG. 3. The system of improving dysarthria speech intelligibility 100 can include a speech disordering module 110 and a voice conversion model trainer 120.

The speech disordering module 110 can receive a reference corpus 111 formed by a reference speaker's speech signal and a patient corpus 112 formed by a patient speaker's speech signal. For example, the patient speaker can be a dysarthria patient. The speech disordering module 110 can convert the set of paired corpus, including the reference corpus 111 and the patient corpus 112 that correspond to each other, into a synchronous corpus 113.

In an embodiment, the speech disordering module 110 can be implemented by a Gaussian-mixture-model-based voice conversion system or a deep-neural-network-based voice conversion system, or implemented by extracting speech feature parameters and using the speech synthesis technology. In an embodiment, the speech feature parameters can include jitter and shimmer, and so on.

The voice conversion model trainer 120 can receive the reference corpus 111 and the synchronous corpus 113 as the set of training corpus, and the set of training corpus is used to train the voice conversion model, thereby improving the training and conversion qualities of the voice conversion model.

In an embodiment, the voice conversion model trainer 120 can be implemented by a Gaussian-mixture-model-based voice conversion system or a deep-neural-network-based voice conversion system.

Figure 4:
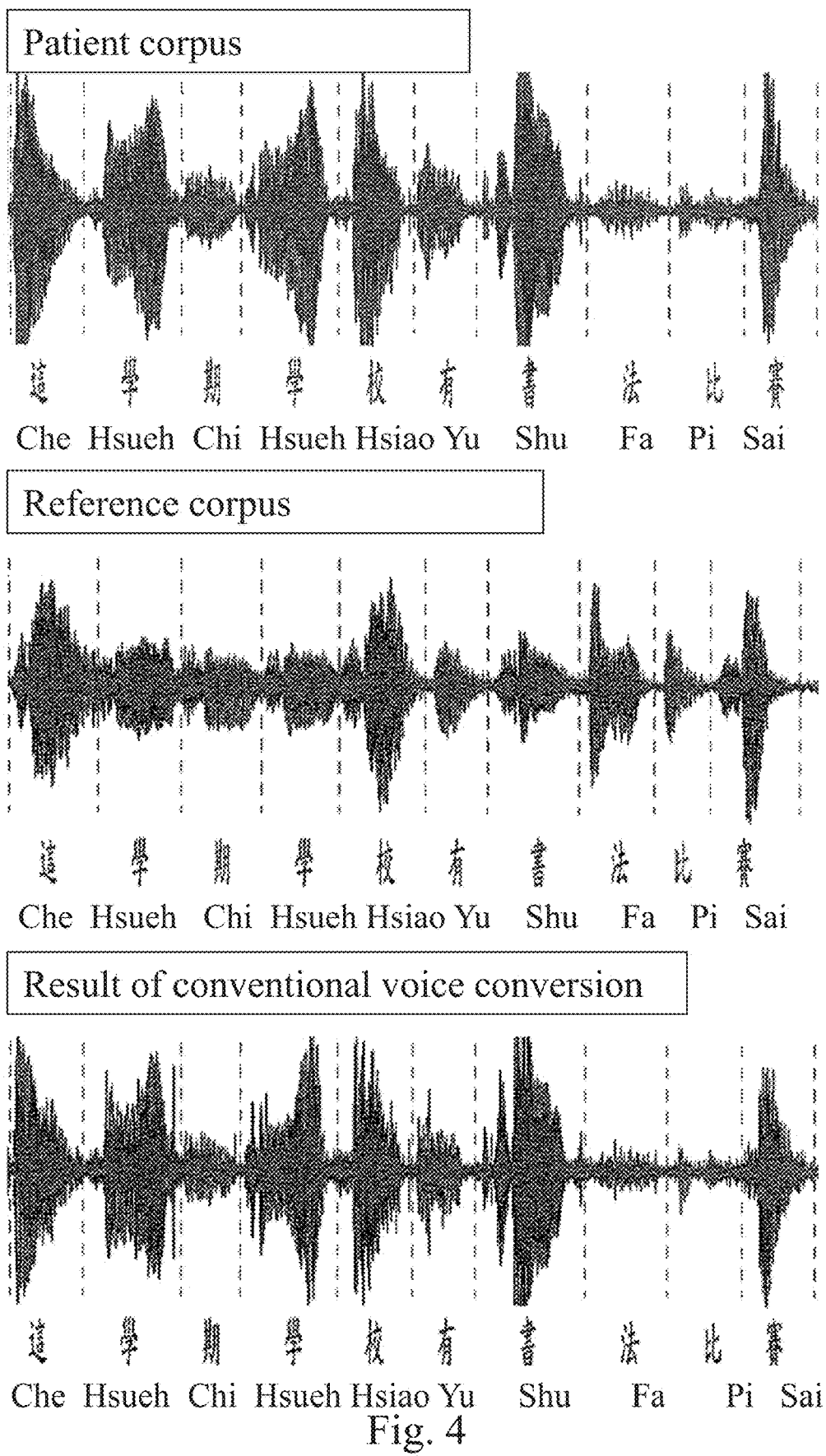
FIG. 4 is a schematic view of how the conventional dysarthria voice conversion system generates an improved dysarthria corpus.
Figure 5:
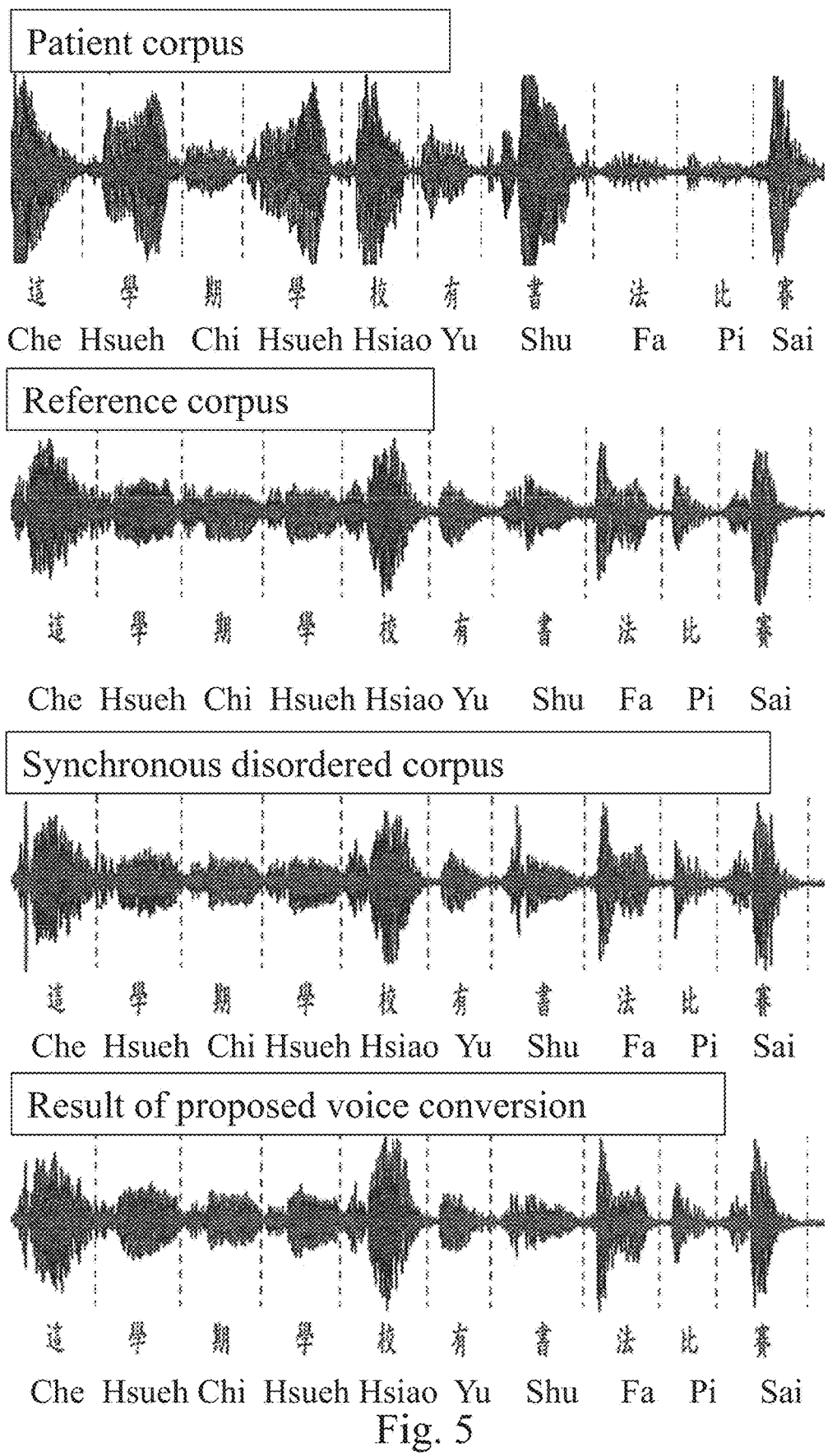
FIG. 5 is a schematic view of how the system of improving dysarthria speech intelligibility generates a corpus, according to an embodiment of the present invention.

Please refer to FIGS. 4 and 5, which show how the conventional dysarthria voice conversion system and the embodiment of the present invention convert the reference corpus of a dysarthria patient to obtain the modified corpus, respectively. As shown in FIG. 4, the conventional voice conversion system for the dysarthria patient usually uses the speech alignment technology such as DTW, PSOLA, to perform pre-processing for aligning the speech features of the reference corpus and the patient corpus, but there are still slight errors existing in the frame alignment of the result of conventional voice conversion, which is generated by voice conversion. As shown in FIG. 5, the system of the present invention facilitates the user to merely provide the paired corpus including the reference corpus and the patient corpus, and the system can generate the new corpus which is fully synchronous with the reference corpus in frame and can be used as a training corpus for voice conversion model, so that the training quality of the voice conversion model and the quality of the modified corpus after conversion can be greatly improved.

According to above-mentioned contents, the system of improving dysarthria speech intelligibility and the method of the present invention can use the speech disordering module to generate the synchronous corpus for training. Compared with the conventional voice conversion system, the system and method of the present invention do not need to use the speech alignment technology to perform pre-processing on the training corpus, so that the manpower and time cost of manual alignment can be reduced, and the entire corpus generation process can be performed automatically. Furthermore, since the synchronous corpus outputted by the speech disordering module, is generated by processing the reference corpus, the synchronous corpus can reserve the original speaking rate of the reference corpus, thereby ensuring that the newly-generated synchronous corpus is completely synchronized with the reference corpus, and the system can use the synchronous corpus and the reference corpus as the training corpus to complete the training of the voice conversion model of the reference speaker and the patient speaker (such as dysarthria patient). Using the system and method of the present invention can make dysarthria patients have better speech intelligibility. At the same time, the system and the method of the present invention also confirm that the training and conversion qualities of the voice conversion model can be further improved.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A system of improving dysarthria speech intelligibility, comprising:
    a processor comprising hardware, wherein the processor is configured to receive a set of paired corpus comprising a reference corpus and a patient corpus corresponding to each other, and convert the set of paired corpus into a synchronous corpus; and
    a voice conversion model trainer, comprising hardware, coupled to the processor, wherein the voice conversion model trainer is configured to receive the reference corpus and the synchronous corpus, as a set of training corpus, and use the set of training corpus to train a voice conversion model;
    wherein speaking rates of the synchronous corpus and the reference corpus are equal and the synchronous corpus reserves an original timbre of the reference corpus;
    wherein the synchronous corpus is a converted reference corpus and the synchronous corpus completely synchronizes with the reference corpus;
    wherein before training the voice conversion model, no corpus alignment is performed on the synchronous corpus and the reference corpus;
    wherein the processor is implemented by a well-trained Gaussian-mixture-model-based voice conversion system or a well-trained deep-neural-network-based voice conversion system.

2. The system according to claim 1, wherein the voice conversion model trainer is implemented by a Gaussian-mixture-model-based voice conversion system.

3. The system according to claim 1, wherein the voice conversion model trainer is implemented by a deep-neural-network-based voice conversion system.

4. A method of improving dysarthria speech intelligibility, comprising: receiving a set of paired corpus comprising a reference corpus and a patient corpus corresponding to each other;
   converting the set of paired corpus into a synchronous corpus; and
   using the reference corpus and the synchronous corpus as a set of training corpus, and using the set of training corpus to train a voice conversion model;
   wherein speaking rates of the synchronous corpus and the reference corpus are equal and the synchronous corpus reserves an original timbre of the reference corpus;
   wherein the synchronous corpus is a converted reference corpus and the synchronous corpus completely synchronizes with the reference corpus;
   wherein before training the voice conversion model, no corpus alignment is performed on the synchronous corpus and the reference corpus;
   wherein the step of converting the set of paired corpus into the synchronous corpus, is implemented by a well-trained Gaussian-mixture-model-based voice conversion system or a well-trained deep-neural-network-based voice conversion system.

5. The method according to claim 4, wherein the step of using the set of training corpus to train the voice conversion model is implemented by a Gaussian-mixture-model-based voice conversion system.

6. The method according to claim 4, wherein the step of using the set of training corpus to train the voice conversion model is implemented by a deep-neural-network-based voice conversion system.

* * * * *